US012700199B2

(12) United States Patent
Weisman et al.

(10) Patent No.: US 12,700,199 B2
(45) Date of Patent: Aug. 4, 2026

(54) LOCATION-BASED AUGMENTED REALITY METHOD

(71) Applicants: Jordan Kent Weisman, Bellevue, WA (US); William Gibbens Redmann, Glendale, CA (US)

(72) Inventors: Jordan Kent Weisman, Bellevue, WA (US); William Gibbens Redmann, Glendale, CA (US)

( * ) Notice: Subject to any disclaimer, the term of this patent is extended or adjusted under 35 U.S.C. 154(b) by 140 days.

(21) Appl. No.: 18/780,500

(22) Filed: Jul. 23, 2024

(65) Prior Publication Data

US 2024/0378830 A1      Nov. 14, 2024

Related U.S. Application Data

(63) Continuation of application No. 18/108,531, filed on Feb. 10, 2023, now Pat. No. 12,079,941, which is a continuation of application No. 17/584,319, filed on Jan. 25, 2022, now Pat. No. 11,580,710, which is a continuation of application No. 17/208,241, filed on (Continued)

(51) Int. Cl.

| | |
|---|---|
| *G06T 19/00* | (2011.01) |
| *A63F 13/213* | (2014.01) |
| *A63F 13/30* | (2014.01) |
| *A63F 13/795* | (2014.01) |
| *A63F 13/847* | (2014.01) |
| *A63F 13/92* | (2014.01) |
| *G06T 15/20* | (2011.01) |
| *H04L 12/18* | (2006.01) |

(52) U.S. Cl.
CPC .......... *G06T 19/006* (2013.01); *A63F 13/213* (2014.09); *A63F 13/30* (2014.09); *A63F 13/795* (2014.09); *A63F 13/847* (2014.09); *A63F 13/92* (2014.09); *G06T 15/20* (2013.01); *H04L 12/1822* (2013.01); *G06T 2219/024* (2013.01)

(58) Field of Classification Search
CPC . G06T 19/006; G06T 15/20; G06T 2219/024; A63F 13/213; A63F 13/30; A63F 13/795; A63F 13/847; A63F 13/92; H04L 12/1822
See application file for complete search history.

(56) References Cited

U.S. PATENT DOCUMENTS

| | | | | |
|---|---|---|---|---|
| 8,547,401 | B2 * | 10/2013 | Mallinson ............. | A63F 13/217 |
| | | | | 345/632 |
| 2010/0191728 | A1 * | 7/2010 | Reilly ..................... | G06T 11/60 |
| | | | | 707/E17.019 |

(Continued)

*Primary Examiner* — Edward Martello

(57) ABSTRACT

A location-based, multiuser, collaborative augmented reality (AR) system employs individual AR devices for viewing real-world anchors, that is, physical models that are recognizable to the camera and image processing module of the AR device. Multiple, distinct AR sessions can coexist at the same physical site, and those sessions can be offered to AR devices at the site. Session initiators can manage who can join and/or to whom invitations to join are extended. The system permits collaborative AR to span multiple sites, by associating a portal with an anchor at each site. Using the location of their corresponding AR device as a proxy for their position, AR renditions of the other participating users are provided. This AR system is particularly well suited for games.

7 Claims, 8 Drawing Sheets

Related U.S. Application Data

Mar. 22, 2021, now Pat. No. 11,263,822, which is a continuation of application No. 16/459,620, filed on Jul. 2, 2019, now Pat. No. 10,957,111, which is a continuation of application No. 15/721,956, filed on Oct. 1, 2017, now Pat. No. 10,339,717, which is a continuation of application No. 14/309,821, filed on Jun. 19, 2014, now Pat. No. 9,779,548.

(60) Provisional application No. 61/839,364, filed on Jun. 25, 2013.

(56) References Cited

U.S. PATENT DOCUMENTS

| | | | | |
|---|---|---|---|---|
| 2012/0198021 A1* | 8/2012 | Ahn | ...................... | G06T 19/006 |
| | | | | 709/217 |
| 2012/0229508 A1* | 9/2012 | Wigdor | ................ | G06T 19/006 |
| | | | | 345/633 |
| 2012/0263154 A1* | 10/2012 | Blanchflower | ......... | G06T 11/60 |
| | | | | 455/414.1 |
| 2013/0293468 A1* | 11/2013 | Perez | ...................... | G06F 3/033 |
| | | | | 345/158 |
| 2014/0015827 A1* | 1/2014 | Rapoport | ............. | G06T 19/003 |
| | | | | 345/419 |

* cited by examiner

LOCATION-BASED AUGMENTED REALITY METHOD

FIELD OF THE INVENTION

The present invention relates generally to an augmented reality system. More particularly, it relates to a system and method for allowing multiple participants to share in an augmented reality session, based on the real-world location.

BACKGROUND OF THE INVENTION

Augmented reality (AR) toys have been introduced. The basic hardware required, an AR device, is a smartphone, laptop, tablet computer, dedicated device, or the like, that views the real world with a camera, and displays that view on a display to a user. Additionally, the AR device runs software that recognizes certain objects (herein termed "anchors") in the camera's field of view, including the anchor's apparent distance and orientation relative to the camera, and then augments the image from the camera with computer generated graphics that seem to appear in, on, or near the anchor. The resulting modified image is displayed to the user (often, a game player, in which case, the AR device may also be executing game code).

An example of such toys includes a line of jigsaw puzzles, by Ravensburger AG of Ravensburg, Germany which when viewed with the corresponding AR app on a smartphone or tables replaces a portion of the puzzle with animated figures. Another one is called "AR Games" by Nintendo Co., Ltd. of Kyoto, Japan, which provides preprinted paper cards as anchors and plays on their Nintendo 3DS handheld gaming system. The Eclipse AR Card Game by MoOn-Studio of also uses preprinted cards as anchors and allows two players to interact by manipulating the cards, however the two players share a single camera and display attached to a personal computer provides the same view to both players.

SUMMARY OF NEEDS UNSATISFIED BY PRIOR ART

None of these games offers each of several players their own AR device (e.g., smartphone, tablet, or game system) to allow the players to each view the same anchors and see a mutually coherent augmented reality.

Further, in cases where potentially duplicative anchors coexist in proximity to each other, prior AR systems do not resolve the resulting ambiguity.

None of the existing AR systems insert a representation of the users into the AR in place of their own AR device, whether by recognizing the AR device as an anchor itself, or by having an AR device report its orientation and distance from another anchor.

Finally, existing AR systems do not offer an ability to cojoin a first site having anchors and AR devices with anchors and AR devices at a second site, so as to give users at the distinct sites an apparently coherent AR world.

OBJECTS AND SUMMARY OF THE INVENTION

The object of the present invention is to allow several players, each with their own AR device, to share a mutually coherent augmented reality.

It is a further object of the present invention to mitigate the ambiguities that would otherwise occur if two like anchors were used near each other.

It is a still further object of this invention to allow sharing of a mutually coherent augmented reality from otherwise distinct sites.

Finally, it is an additional object of this invention to render into the augmented reality a representation of the users, whether AR devices are recognized as anchors by other AR devices, or by having an AR device report to other AR devices its own orientation and distance with respect to one or more other anchors.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
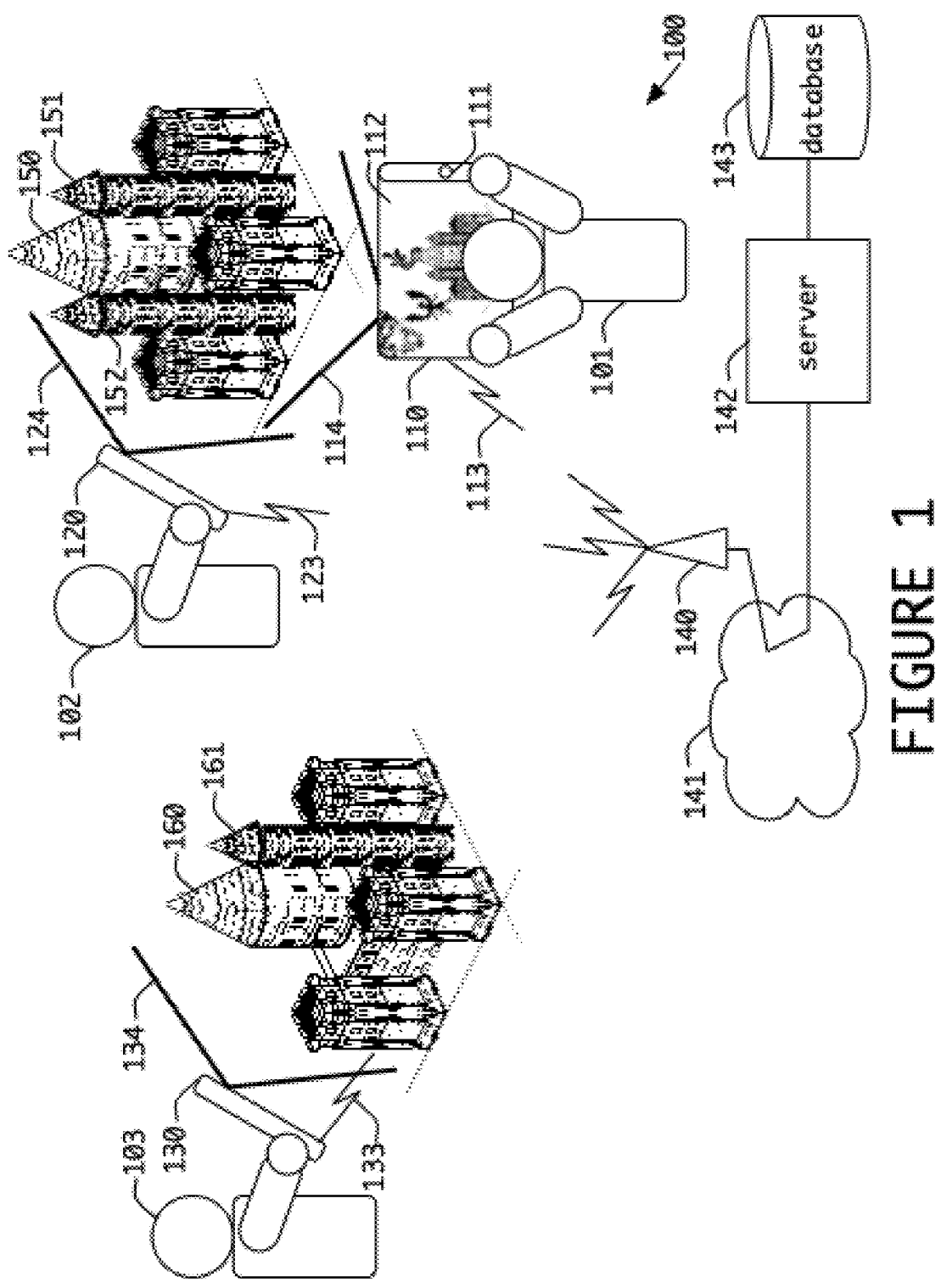
FIG. 1 is a block diagram of a collaborative AR system being used in a situation where there are two sessions going on, one with one player, and one with two players.

FIG. 1 shows three AR users 101, 102, 103, at site 100, in this case players of an AR game, each having a corresponding AR device 110, 120, 130.

Each of the AR devices 110, 120, 130, in this embodiment, has controls for use by respective user, e.g., button 111 and touchscreen display 112. Each has a camera offering corresponding fields of view 114, 124, 134 and corresponding wireless connections 113, 123, 133 to wireless station 140 which offers connectivity, for example via Internet 141, to server 142 having communication with database 143.

FIG. 1 shows two toy castles 150, 160, used as anchors recognizable by the AR devices. In the prior art, if anchors were not absolutely unique, AR devices 110, 120, 130 could not determine whether their respective views of castles 150 and 160 would correspond to a single anchor, or whether they were distinct copies. For example, AR devices 110 and 120, each viewing castle/anchor 150 could not be sure that there were not two castles that looked alike (castle 150 and a duplicate), or if there was only one castle 150.

In the present invention, even though the anchors are not strictly unique, the potential ambiguity is resolved by communication with server 142 in which each AR device registers the anchors it recognizes in conjunction with the general location of the AR device, for example as determined by GPS (Global Positioning System), cellular telephone or Wi-Fi antenna proximity, etc. In this case, each of the AR devices 110, 120, 130 report proximity to wireless station 140. An example series of transactions might go like this: First, AR device is directed by user 101 to start a session. AR device 110 recognizes an anchor (castle 150) and registers it in conjunction with the session just started with the location information identifying wireless station 140 (or perhaps GPS information obtained directly by AR device 110 or attributed to wireless station 140). Subsequently, player 102 attempts to play with AR device 120. Player 102 can either explicitly join the session of player 101, or AR device 120 can recognize the anchor that is castle 150 and report it to server 142. If AR device 120 reports anchor 150 in conjunction with the location as determined by AR device 120 (which can include location information identifying wireless station 140), server 142 can respond that the anchor embodied in castle 150 is already assigned to a session belonging to player 101 and question whether player 102 wants to join the session of player 101. In a case where AR device 120 reports that it is joining the session of AR device 110, the anchors reported by AR device 120 are considered to be the same as like anchors reported by AR device 110 (i.e., castle 150).

However, player 103 may choose to start a session of his own, using AR device 130. AR device 130 determines its location, for example being proximate to wireless station 140, or by GPS coordinate, etc., and recognizes castle 160 as an anchor in its field of view 134. Initially, take the anchor provided by castle 160 as being a duplicate of castle 150, that is, the AR devices cannot distinguish between them. When AR device 130 attempts to register castle 160 (then a duplicate of castle 150), at the same location as castle 150 is already registered, server 142 will ask whether player 103 is attempting to join the session of player 101. Here, player 103 is not attempting to join a session already started, rather is attempting to start a second, independent session (which perhaps his friends, soon to arrive, will play with him). In this circumstance, server 142 must deny the registration of still-identical castle 160 to a separate session. It could be confused with castle 150 and actions by player 103 could inadvertently and adversely affect game play corresponding to castle 150. Instead, player 103 could use a different anchor (not shown here) or may modify castle 160 to make it recognizably distinct from castle 150 to the AR devices. In this example embodiment, castle 150 has two towers 151, 152. As shown, castle 160, once modified by removing a tower, has only one remaining, tower 161 (the tower removed from castle 160 is not shown). Instead of modifying towers, markers or labels (not shown) applied to various parts of castle 160 could be switched, or reoriented, or added. Pennants, small colored or patterned flags arranged on flagpoles where they can be easily seen and identified by the AR devices and recognition software, might be added, removed, or altered.

As an anchor is being registered for a new session, server 142 might even propose the modification to be made. For example, server 142 might prescribe a particular pennant or sequence of pennants to a player starting a session. That way, any player directing his AR device at an anchor so configured will be automatically entered into the corresponding session having substantially the same location.

Server 142 might prescribe the configuration for every anchor being added to a session or may prescribe the configuration only for those anchors which seem to conflict with anchors already registered in session with a sufficiently similar location.

In this case, "sufficiently similar location" would be established by policy. If GPS is used, this could mean within the accuracy of the GPS reading, plus an error band, times two, which might be 100 m or some other predetermined value, which may vary by the location itself (e.g., larger in cities and smaller in rural areas where GPS can be more accurate). The same is true of location services that use the cellular telephone network antennas for triangulation of location. If proximity to WIFI is used for location, "sufficiently similar" might be when both AR devices can detect the same WIFI antenna, though policy might limit that to detection with more than a predetermined signal strength (e.g., "two bars", so many dBm, or milliwatts).

Once multiple players have joined a common session, as with players 101 and 102, the augmented reality views displayed by AR devices 110 and 120 are coherent, that is, they reflect the same augmented reality, even though the corresponding players views of that common augmented reality are different. This is shown clearly in FIG. 2, where AR devices 110, 120, 130 are shown (in this embodiment, each is a tablet). The touchscreen display 112 of AR device 110 shows image 210 in which castle 150 is shown from the vantage of field of view 114 as castle image 251. The AR software has embellished this view of the castle with a computer-generated dragon 212 just having set fire 213 to the far side of the castle. AR device 120 displays image 220, showing castle 150 as seen in field of view 124. The augmented reality elements of the dragon and fire are seen here, but since player 102 has a view of the back side of the castle, castle image 252 is seen with flames 223 coming out the near side with dragon 222 shown in the foreground.

In some embodiments, when AR device 120 is in the field of view 114 of AR device 110, AR device 120 may be recognized as an anchor having the role associated with player 202. In such a case, in augmented reality image 210, the anchor that is AR device 120 might be replaced by an appropriate visage 214 representing the viewpoint of the other player.

In an alternative embodiment, the AR devices need not be recognized as anchors themselves, nor ever be detected by the other AR devices. In such a case, each AR device may determine its range from and orientation with respect to one or more anchors (e.g., castle 150) in the session, and report this information to the other AR devices, either directly or through server 142. In this way, even when AR device 110 does not fall within the field of view 124 of AR device 120, in AR image 220, AR device 120 can place an indicator 224 to show in what direction the other player(s), i.e., player 101, are located. This can be useful in a game context, to help a player anticipate what another player is thinking or doing, or where is attention is directed. This feature is particularly valuable with respect to games conducted across multiple sites, where direct viewing of the opposing player is not available, as discussed below in conjunction with FIGS. 7 and 8.

Figure 2:
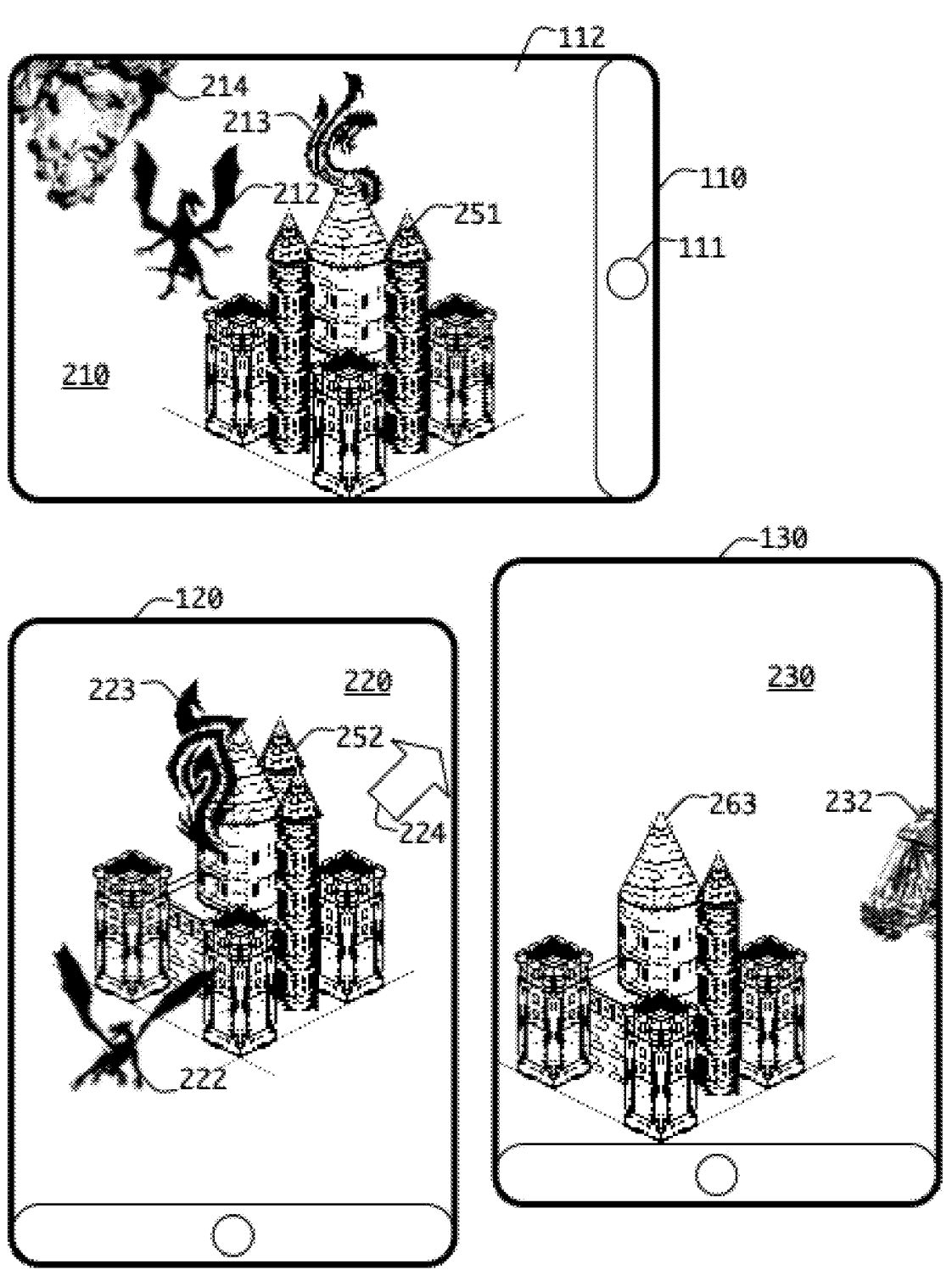
FIG. 2 illustrates the detailed displays from the three AR devices in the system of FIG. 1.

Also in FIG. 2, the augmented reality image 230 displayed by AR device 130 is show, with image 263 of castle 160. Here, no dragon is attacking the castle. Instead, a computer-generated siege engine 232 is attacking the castle image 263, and player 103 is engaged in a session separate from that which players 101 and 102 are enjoying together.

Figure 3:
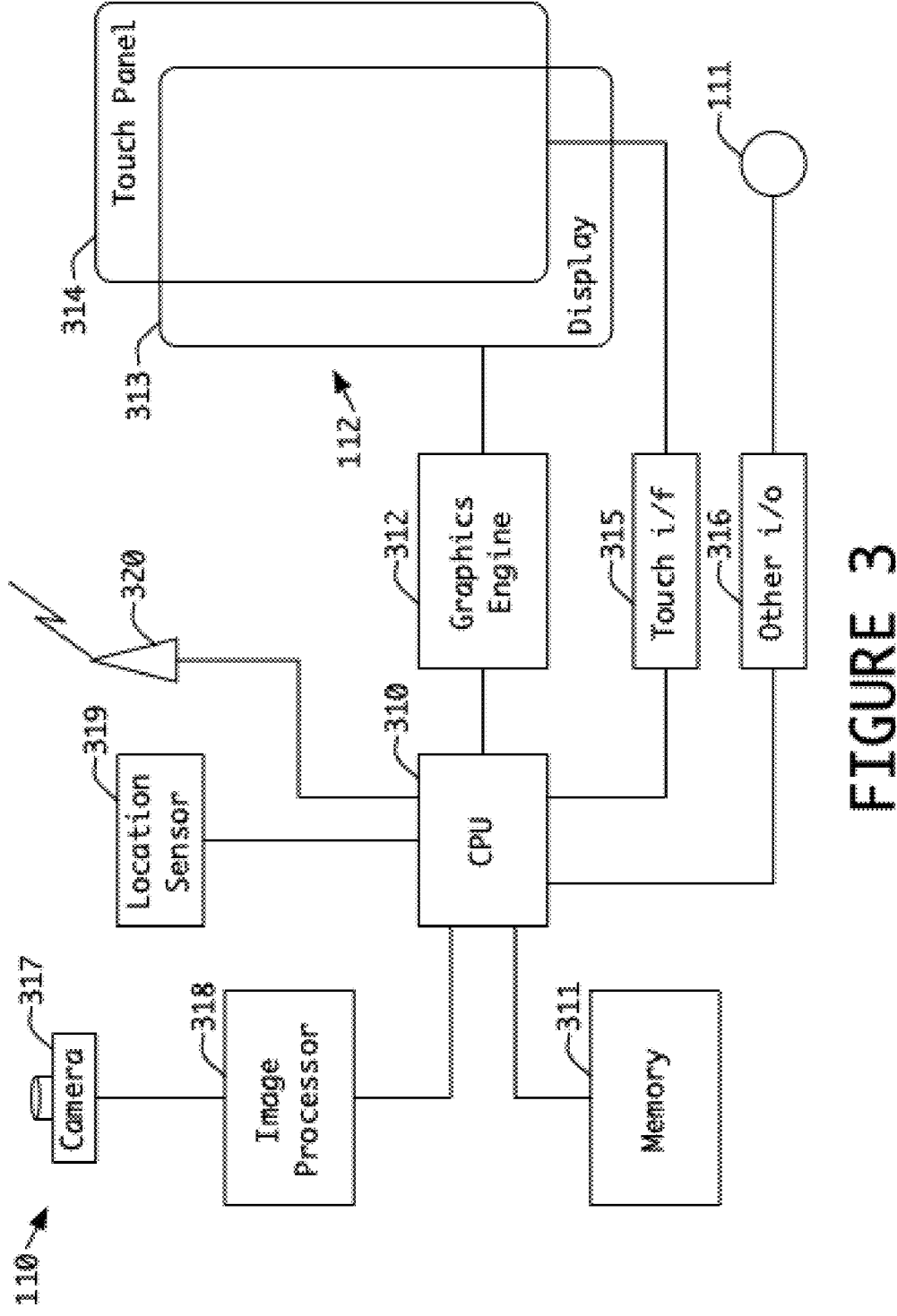
FIG. 3 shows one example block diagram for an AR device, as might be implemented using a tablet.

FIG. 3 provides an example block diagram for AR device 110. Processor (CPU) 310 uses memory 311 in which is stored the AR application software, corresponding data, and operating system code. Processor 310 directs graphic engine 312 which drives display 313, which is overlayed by touch panel 314 which together form touchscreen 112. Touch panel 314 is monitored by touch interface electronics 315, which report user interactions back to processor 310. Other user interface devices, such as button 111 are monitored by other I/O interface 316, also reporting to processor 310. Camera 317 provides an image for field of view 114, which is made available to image processor 318 (which could be a software module instead of hardware) wherein the recognition of anchors is performed. Location sensor 319 may comprise one or more of a GPS receiver, accelerometers (for detecting the attitude of AR device 110), gyroscopes (for quickly detecting the magnitude of sudden changes, but also for detecting very slow changes), flux gate compasses (to detect bearing relative to the Earth's magnetic field), etc., all of which have communication with processor 310, either directly or, in some embodiments, through intermediary utility processors (not shown). Finally, processor 310 has access to network communication channel 320, for example, a wireless connection as to station 140, through which communication is available with server 142 and in some embodiments, other AR devices (e.g., 120).

In some embodiments the functions of server 142 may be performed by one of the AR devices, for example the AR device that starts a session, or may be distributed among some or all of the AR devices at a location. For example, an AR device attempting to start a new session might broadcast a signal soliciting information about other sessions or anchors already in use. The response, if any, might indicate which anchors are already in use, in which sessions, and may further suggest other alternate configurations of selected anchors that might be used instead.

Figure 4:
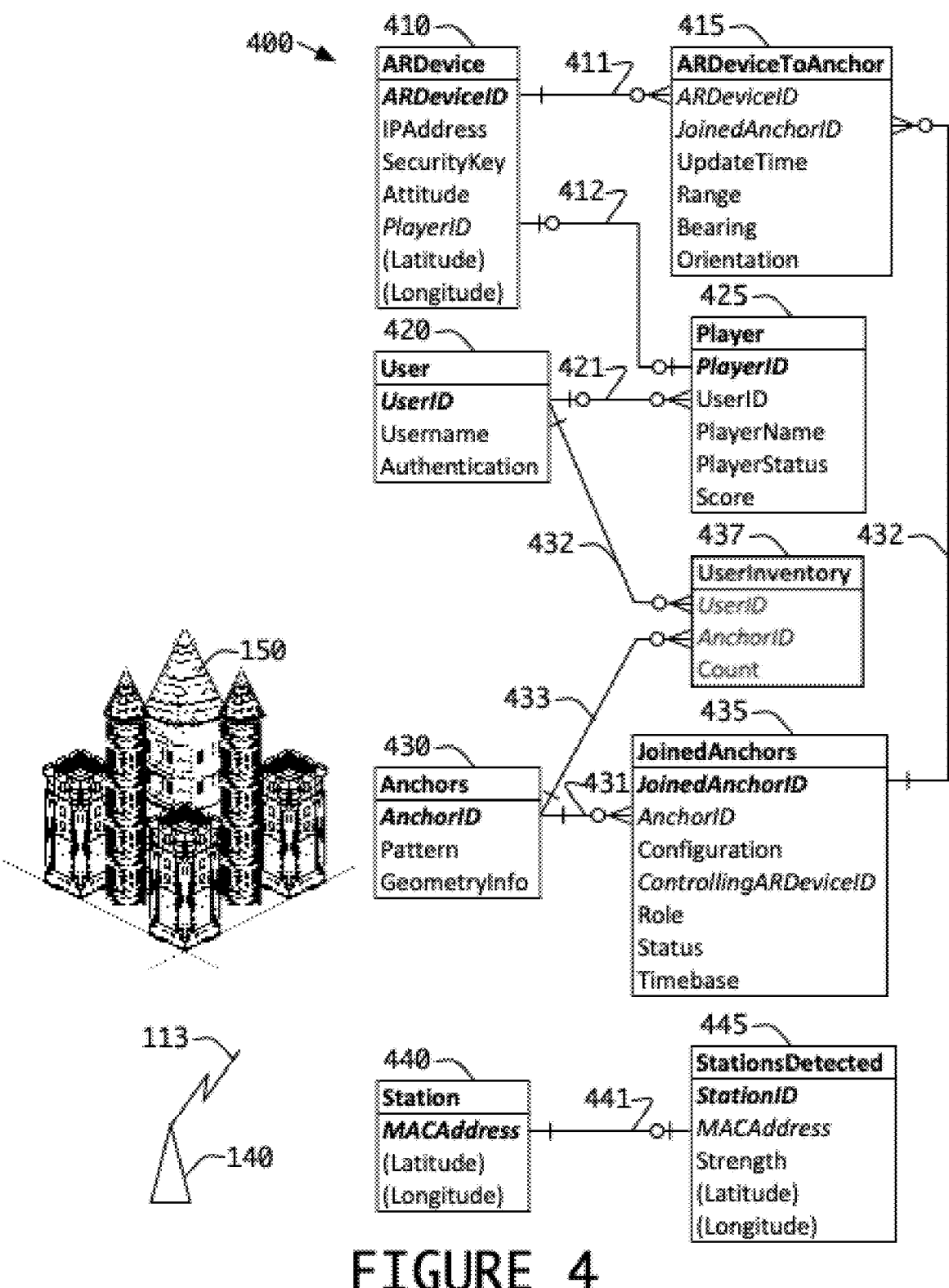
FIG. 4 is one example for a portion of a database accumulated and maintained locally by an AR device for operation in conjunction with other AR devices.

FIG. 4 shows one example of portion 400 of a local database used to keep track of which anchors, wireless stations, and the AR devices known to one AR device (e.g., 110). While illustrated using a relational database connection, those skilled in the art will recognize that many other alternative choices for data representation could be applied and that this representation was chosen for clarity in this example. Device table 410 identifies each distinct AR device (including itself) by a unique identifier, ARDeviceID, which could be a globally unique identifier (GUID) or universally unique identifier (UUID), well known in the art, or other identifier that will not be repeated among other AR devices in the system. The ARDeviceID for the device itself might be provided at the time of manufacture, or by server 142 when AR device 110 first registers itself with the system. The table 410 also includes information relating to one or more communication addresses for each device, e.g., an IP (Internet Protocol) address, MAC (Media Access Control) address, etc. This allows individual AR devices to communicate with other AR devices without going through server 142. One or more security keys may be provided, for example a public/private key, so as to allow a server to communicate securely and authoritatively to an AR device (for example, to supply a software update or carry out a financial transaction), in which case the AR device holds the public key for the server and the server uses its private key to sign or encrypt messages it sends; or if a message is to be authenticated as coming from the AR device, the AR device would use its private key to sign or encrypt the message and the public key (which is the only portion distributed to the server or other devices), would be used to authenticate the message upon receipt. The current attitude and orientation in space (e.g., as determined by accelerometers, gyros, and magnetic compasses in location sensor 319) would be stored in the attitude field, whether obtained from its own sensors or received in communications from other AR devices. Likewise, latitude and longitude, if available whether from GPS or other location service, would be noted. Exactly one player identity (discussed below in conjunction with table 425) is associated via relationship 412 whenever the AR device is participating in a shared session but need not be otherwise. Other fields, not shown, for example, when each AR device was first or most recently contacted might also be recorded here, for example, to determine the age of the attitude and position information.

Table 420 stores information about users of the device, for example their username and authentication. There might be only one record in this table, if the device has only one user. Each user record in table 420 may correspond to zero or more player personae, recorded in player table 425, each having a unique player ID. Each player record is associated with, at most, one user record by the UserID field that forms relationship 421 (Note: Players on other AR devices need not have a corresponding user record on this AR device). Additionally, the player name field records the in-game name for the player, which could be their game character's name. Other fields (not shown) might include or reference a player-specific icon or image; for example, each player might have a unique visage for use when augmented reality scenes are rendered (e.g., for visage 214, if it is to be specific to the player, rather than generic or determined by some other game mechanic). Player status, such as 'INACTIVE' for all players not currently playing, or other game-mediated states would be entered for the local player and could be sent to other AR devices during a session. Likewise, messages describing players received from other AR devices would be gathered here.

In one embodiment, anchors table 430 is constant, or could be authoritatively updated, for example by server 142. In it, the collective records represent a canonical description of each of the available anchors. A representation of the patterns that identify each kind of anchor, including the possible configuration variations, is provided sufficient to inform the image processing module 318 what to look for in the camera image, as to what constitutes an anchor to be recognized. Also included is a field describing in detail the geometry of the anchor (e.g., the geometric shape of castle 150), sufficient so that graphics engine module 312 can orient the geometry of the anchor to the recognized patterns, so that when the camera image is being augmented, the geometry model can be used to enhance the rendition of the final image. For example, in AR image 210, the geometry of the castle anchor is used to mask flames 213 so that they appear behind the castle image 251 obtained from the camera, whereas in AR image 220, the flames 223 are in front of the castle, but appear to be emanating from a particular window. Additional information (not shown) concerning anchor-specific animations or embellishments that might be added under certain conditions (e.g., how rain should funnel off the roof, or how the walls should look after receiving a certain amount of damage), might also be recorded here. Updates to table 430 would occur if the manufacturer offers new anchors, or if updates to the existing catalog of anchors were to be made.

In some embodiments, alternative patterns may also be included. This would allow readily available objects (e.g., a can from a particular brand of soda) to be used in lieu of castle model 150. In such a case, the geometry information in table 430 would be used to render the castle image 251, because the un-augmented camera image would show a soda can.

In other embodiments, a catalog of anchors could be provided, but dynamically associated with a physical representation (i.e., the pattern), so that a user could make their own anchors, e.g., by printing a suitable barcode on paper, registering that barcode as a pattern associated with a particular anchor record, thereby allowing the printout to be used as the anchor (e.g., in lieu of castle model 150). This would allow a player new to the hobby to quickly set up a complex AR scenario having multiple anchors, without requiring that user to acquire multiple, elaborate physical models such as castle 150. Later, if the user remains interested, the physical models can be acquired. The system may react to the difference between the actual physical model (e.g., castle 150) and the printed proxy, for example by reserving certain features or game capabilities associated with the castle anchor for sessions in which the actual castle model 150 is being used.

A user inventory of anchors a user owns can be maintained in table 437, allowing the system to keep track of which physical anchors (e.g., castle 150) a user owns. Table 437 implements a many-to-many relationship, with each record identifying that a particular user 432 owns a copy of a particular anchor 433. This information can be useful if a server needs to suggest that a different anchor be used because a requested anchor is already committed in a nearby session. The count field would generally be '1', but if a user owned duplicate anchors, the count could indicate how many copies.

Table 435 stores records about the status of anchors that have been joined to (that is, associated with) the current session. The specific anchors detected are identified by relationship 431, and the current configuration of each is noted. If a newly detected anchor is duplicative of another already in use at this site, the server may recommend a different configuration than the one currently in place (for example, where player 303 removed one of the towers from castle 160), or disallow use of the anchor (for example, if all the configurations are already in use nearby, or there are no alternative configurations). If an anchor is accepted into a session, the corresponding joined anchor record is provided with a JoinedAnchorID that provides a unique reference to that specific anchor so that other participating AR devices and server 142 can refer to the anchor unambiguously. The record is further augmented with the identification of which AR device (in table 410) controls the game state of this anchor. Likewise, other information about the anchor may be included, for instance its role (e.g., some anchors are for active play, some may be decoration, some anchors may have been detected, but not joined into the game). Status can comprise many components, as in FIG. 2, anchor 150 (shown as castle images 251, 252) exhibits a status being attacked by a dragon (shown as dragon images 212, 222) and being on fire in the second story of the back side of the main tower (resulting in flame images 213, 223). The corresponding controlling AR device would be executing the appropriate code so that the status advances appropriately, e.g., the fire spreads, the dragon may come under attack by the castle defenders, etc., which would further update the status. Such updates would be propagated to other AR devices participating in the shared AR session so that the AR images 210, 220 present coherent representations of a shared augmented reality. Lastly, table 435 includes a timebase initialized by the controlling AR device (or alternatively by server 142) so that other AR devices have the opportunity to synchronize their representations of status applied to each anchor. For example, if at some point in the progress of the fire that augments images of anchor 150 there is an explosion, it is desirable for the video of the explosion and any sound that might correspond to that event be substantially synchronized, so that players 101 and 102 experience the event and their reaction to it is also simultaneous, thereby reinforcing the coherence of the augmented reality presented by devices 110, 120. If multiple different activities are proceeding with respect to an anchor, for example the fire, dragon attack, defenders (not shown) on the parapets, a thief scaling a wall, each activity represented in the status of the detected anchor may have its own timebase.

Once an anchor has been joined into a session, each participating AR device may begin tracking, recording, and reporting its range, bearing, and orientation with respect to each of the joined anchors. This is shown in table 415, which uniquely relates an AR device (via relationship 411) to a joined anchor (via relationship 432) and then logs range, bearing, and orientation, relative to that anchor in the corresponding record. Often, one or more joined anchors may be out of an AR device's current field of view, in which case, the information presented therein may become stale. For this reason, a field is also maintained to record the last update time, so that an entry that is several minutes old might be recognized as possibly being out of date. Even when an anchor is no longer in the field of view of an AR device, the AR device may extrapolate its relationship to that anchor by considering information from its location sensors 319 (e.g., accelerometers, gyros, compass, etc.), which may be sufficient for some tracking purposes, at least for a short while. A flag (not shown) in each record may indicate whether or not the record is extrapolated, and when its last actual observation of the anchor occurred.

Detected station table 445 keeps track of wireless stations 140 that an AR device is currently detecting. The MAC (media access control) address can be used to identify such stations unambiguously, but a separate station ID is used to keep individual track of the detection records, since more than one AR device might simultaneously be detecting each station. The strength of that detection may also be noted, which may serve as an indicator of distance from that station. By policy, one AR device detecting a particular station with a strong signal may or may not be considered proximal to another AR device detecting that same station with a much weaker signal, for the purposes of this invention. A longer-term record for stations historically detected may be kept in station table 440, with which records in detected stations table 445 are associated by relationship 441. If a station reports its location, or is otherwise able to be associated with a latitude and longitude, this data can be recorded in these records, but is not strictly required, though it can be useful for determining the location of an AR device.

Figure 5:
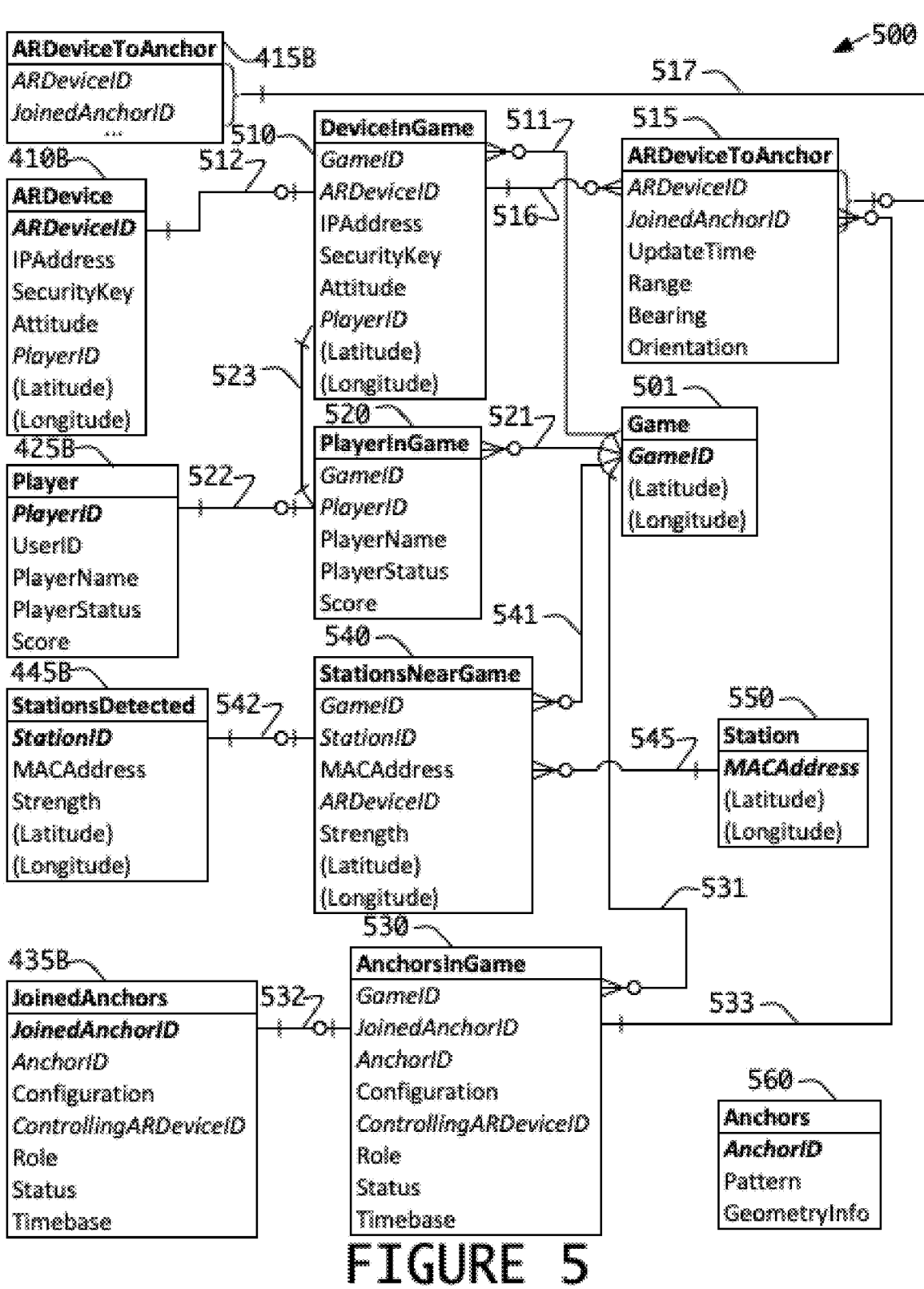
FIG. 5 is one example database maintained by a server for facilitating joint AR sessions and mitigating collisions of identical anchors.

FIG. 5 shows a portion of the master database 500 and its association with the various local databases 400 maintained by each AR device. Records 410B, 415B, 425B, 435B, and 445B represent individual records received from or sent to individual AR devices, corresponding to their similarly numbered tables (without the 'B'). Received records (or messages having similar content) provide updates to the master database 500, while updates to the individual AR devices can take similar form when sent and keep all the session participants updated. Upon receipt by server 142, such records can be forwarded to other AR devices participating in the same session, though in some implementations this need not be done if the information is already communicated to the other AR devices by the originating AR device directly.

Table 501 tracks ongoing sessions and their current location, for example by determining their latitude and longitude of one or more of the participating AR devices. In some embodiments, a field may be included to identify which player 'owns' the session (not shown in table 501), for instance for use implementations where a new player attempting to join a session is to be a session-owner moderated event, then the session must be able to identify its owner so that the owner can decide whether to admit the new player.

When a record 410B is received, it can be associated with a pre-existing record in table 510 if relationship 512 identifies a record, otherwise, then a record 410B can be inserted into table 510, which is used to track devices present associated with ongoing session. In table 510, the SessionID field forms relationship 511 associated each AR device with exactly one session.

Player records 425B, through relationship 522, populate and update records in table 520 for tracking players currently in the ongoing sessions in table 501 and identified by relationship 521. When an AR device is represented by a record in table 510 is participating in a session, there will be (in this embodiment) exactly one corresponding player in table 520 associated with each AR device via relationship 523.

Station detected records 445B, through relationship 542 populate and update records in table 540 for tracking stations that seems to be near the session identified by relationship 541. Server 142 may keep a long-term database of stations identified in table 550, which may be populated via relationship 545, and updated (in case latitude or longitude changes, as might be the case if a station gets relocated or the estimate of its position is refined).

Joined anchors records 435B, through relationship 532, populate and update the anchors-in-session table 530, associated a joined anchor with a particular session identified by relationship 531.

Table 515 contains records analogous to those in table 415 and is populated and updated by the records 415B received from individual AR device. (In FIG. 5, the record 415B is shown redacted due to space concerns, though the whole of the record is transferred). In records 415B, the two fields ARDeviceID and JoinedAnchorID form a composite foreign key used to form relation 517 to identify records in table 515. Relationship 516 between the device-in-session table 510 and table 515 associates AR devices and the record of their physical position relative to the active anchors listed in table 530 and associated via relationship 533.

In each case, for inbound records 410B, 425B, 435B and 445B, the insertion or update of records into the corresponding tables 510, 520, 530, and 540 includes the additional information of with which session to associate the incoming record. Whether the session identity is explicitly provided by the AR device sending the record, or whether the server 142 determines the session identity on the basis of the AR device sending the message (or the IP address from which the message is sent) is an implementation detail readily solved by those skilled in the art.

Table 560 is the authoritative catalog of anchors that can be used to keep tables 430 in local database 400 up to date as new anchors become available from the manufacturer.

Figure 6:
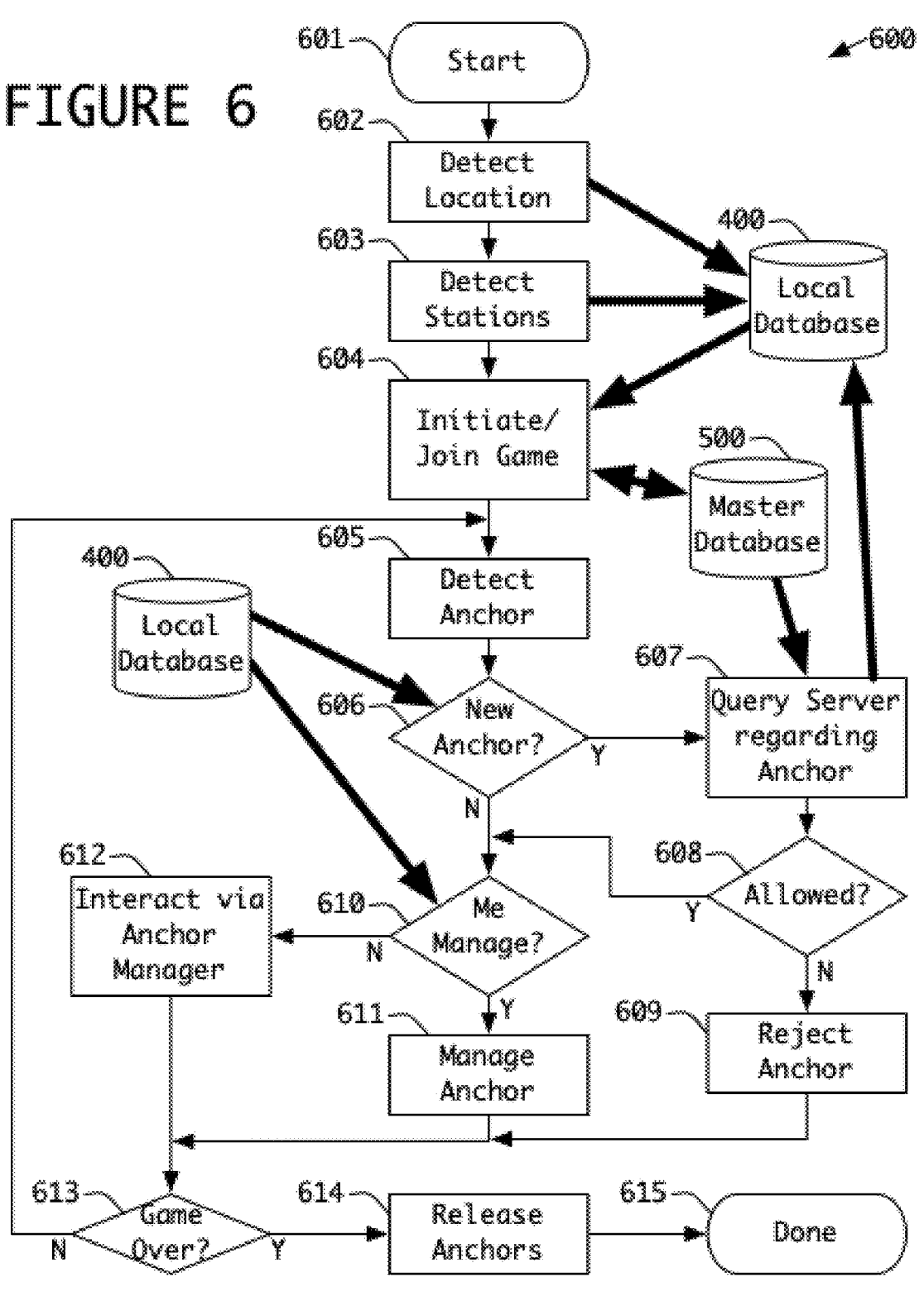
FIG. 6 shows one process for acquiring AR anchors for use in a shared AR session.

Example process 600 for starting or enrolling in a session and joining anchors to that session is shown in FIG. 6, wherein at 601 an AR device, e.g., 110, is directed by the user to initiate or join a session. At 602, using location sensors 319 (e.g., GPS or other locator service) the location of the AR device is obtained or estimated, if possible, and recorded in local database 400, e.g., in the corresponding record in table 410. At 603, any stations detected, such as station 140, are logged in local database 400, in records of table 445. If the stations are new, they can be added to table 440 also. If the location could not be determined at 602, or is otherwise considered to be of low accuracy, a currently or previously determined location corresponding to the stations currently detected at 603 may be used to refine the estimate of the current location.

At 604, a transaction is attempted with server 142, to request a new session, or to join an already existing session. As part of the transaction, information concerning the AR device, including its location, is provided. The location information may comprise some or all of the stations currently (or recently) detected, as logged in table 445. Server 142 accepts any request for a new session and responds to a request to join a session with a list of available sessions proximal to the location of the AR device. If only one nearby session is available, the response may be automatically joined to that session without a further query from server 142 back to the requestor as to which nearby session to join. If, as a matter of policy, the initiator of a session (the session's "owner") controls who may join the session, then permission to join the session may wait for a response from the session owner. In some embodiments, discussed below in conjunction with FIGS. 7 & 8, one might join a session that is not nearby, in which case the choice of which session to join may be made using the player name of the owner or in response to an invitation (not shown) from the owner, which might identify the session by the SessionID field in table 501, or similar mechanism.

Upon joining a session in progress, information in those records in tables 510, 515, 520, 530, and 540 having an association with the session just joined are sent to the AR device just joining, thereby adding records corresponding to the session tables 410, 415, 425, 435, and 445, allowing an augmented reality to be presented coherently over the multiple participating AR devices.

Once having initiated or joined a session at 604, processing continues at 605 where anchors, such as castle 150, are detected when corresponding field of view 114 of camera 317 captures an image of the anchor (castle 150), which is then recognized by image processor module 318 as corresponding to an anchor record in table 430. At 606 a check is made by examining local database 400 to see if that anchor is already listed in joined anchors table 435, in the configuration noted by image processor module 318. If not, then the anchor is new to this session and server 142 is queried at 607 to determine whether the new anchor will be admitted.

Server 142 determines whether the new anchor is allowable by checking to see whether any copies of that anchor in the observed configuration are already registered in table 530 to another session having a location too close by (as determined by policy) or which is associated with nearby stations listed in table 540 that are also associated with the current session requesting the anchor. If either of these is the case, the anchor in its current configuration is rejected at 609. The server 142 may recommend a particular different configuration for the anchor detected at 605, which might be computed by the server by examining nearby sessions for all configurations of the same anchor, and removing those from a list of possible configurations as determined by the pattern information in the anchor catalog 560. If there are no available configurations for that particular anchor, the server 142 may report this, too, whereby the player is saved from fruitlessly trying numerous configurations that would not have a chance of succeeding. A further computation could determine for which anchors in the players personal inventory, as represented by table 437, there are available configurations, though this may require server 142 obtaining a copy of table 437, which could be achieved by the above methods used to synchronize the various tables. The result of such advice would be that the player is provided with likely-to-succeed suggestions for other anchors that might be used. Once the proposed anchor has been rejected at 609, processing tests to see whether the session has been terminated at 613, and if not, loops back to 605. If at 608 the determination from server 142 is that the anchor is allowed, then a corresponding record is added to master joined anchors table 530 and propagated via transmission record 435B to be recorded in the joined anchor table 435 of each of the AR devices participating in the same session. Server 142 may set the controlling AR device field in the corresponding joined anchor record to identify the requesting AR device, or may choose a different AR device if the requestor is becoming overloaded (e.g., for being the controller of too many anchors).

After a new anchor is allowed at 608, processing continues at 610. At 606, the anchor and configuration recognized at 605 may be found to already be represented in table 435, which may be because it was previously added following an allowance at 608 or because it was already a part of the session before this AR device joined in and was populated during 604. If this is the case, then at 606 the anchor is determined to not be new, and here too, processing continues at 610.

At 610, the controlling AR device field in the corresponding joined anchor record in table 435 is examined. If the field indicates that this AR device is the controller, then at 611 the AR devices begins to initialize the game processes corresponding to that anchor as defined in at least the corresponding record in anchor catalog 430. As the anchor management activity at 611 has been dispatched (e.g., on other processing threads), process 600 continues at 613 as before. In some embodiments, this same initialization may be performed when a newly assigned controller receives an update message 435B in which it is assigned the controllership of a new anchor, but one added to the session by a different AR device. In still other embodiments, an AR device might be passed the controllership of an anchor by the previously controlling AR device, for example when the previous controller is leaving the session, or communication with it has otherwise been lost.

At 611, interaction with the anchor, other than initializing it, may be performed. This is especially true in subsequent passes, once the game gets going.

If at 610 the management of the present anchor is not the responsibility of the current AR device (i.e., the controlling AR device field does not match the current AR device), then at 612, any interaction with the anchor is directed to its current controller, either directly via station 140 (or other communication mechanism, e.g., Bluetooth™), or via server 142.

The interactions that can take place directly at 611 or indirectly at 612 are how the anchor and its augmented reality components are made interactive. For example, a player may direct the defenders of castle 150 to counterattack the dragon, or task them with knocking back the fire. Interactions with the AR rendition of the castle may allow walls to be opened so that the activities inside can be examined, etc. In other scenarios with different anchors, for example representing spaceships, the augmented reality display may present controls for the augmented anchors that increase their shields, fire their weapons, or otherwise provide an interactive interface to the anchor's augmented rendition. The capabilities of such interactions are the essence of the game design.

Some interactions may be limited to certain players, regardless of which AR device is the controller. For example, the player designated as the occupant of the castle (a game-specific state not explicitly represented in the database as illustrated, outside of the joined anchor's 'status' or 'role' fields) may be allowed defensive interactions, e.g., closing the gates, placing the guard on alert, etc., and provided with comprehensive status and reporting, since all, or at least most, of the virtual personnel in the castle are his to command. Another player may be provided with a different set of interactions, e.g., transacting in the castle marketplace, or sending a thief to scale the walls, or attacking it with a dragon.

As before, at 613, if the session has not ended, the process returns to 605. Each anchor in the current field of view may be detected. As the session progresses, only previously added anchors are being identified at 606, and the interactions with them, whether at 611 or 612 represent the bulk of the activity of process 600 for most of the session's duration. Also at either 611 or 612, if the range, bearing, or orientation of the AR device with respect to the detected anchor has changed, then an update may be made to the corresponding record in table 415, and at least occasionally sent (e.g., every 10 seconds, up to a few times per second) to server 142 as update records 415B which are then propagated to the other participating AR devices.

If at 613 the session has ended, or the player of the current AR device has decided to quit, then at 614 the anchors are released, or assigned to other controlling AR devices, and this is communicated to server 142. If the session is over, all associated records in tables 510, 515, 520, 530, 540 are deleted from master database 500 and tables 435 and 415 are cleared in local database 400.

Figure 7:
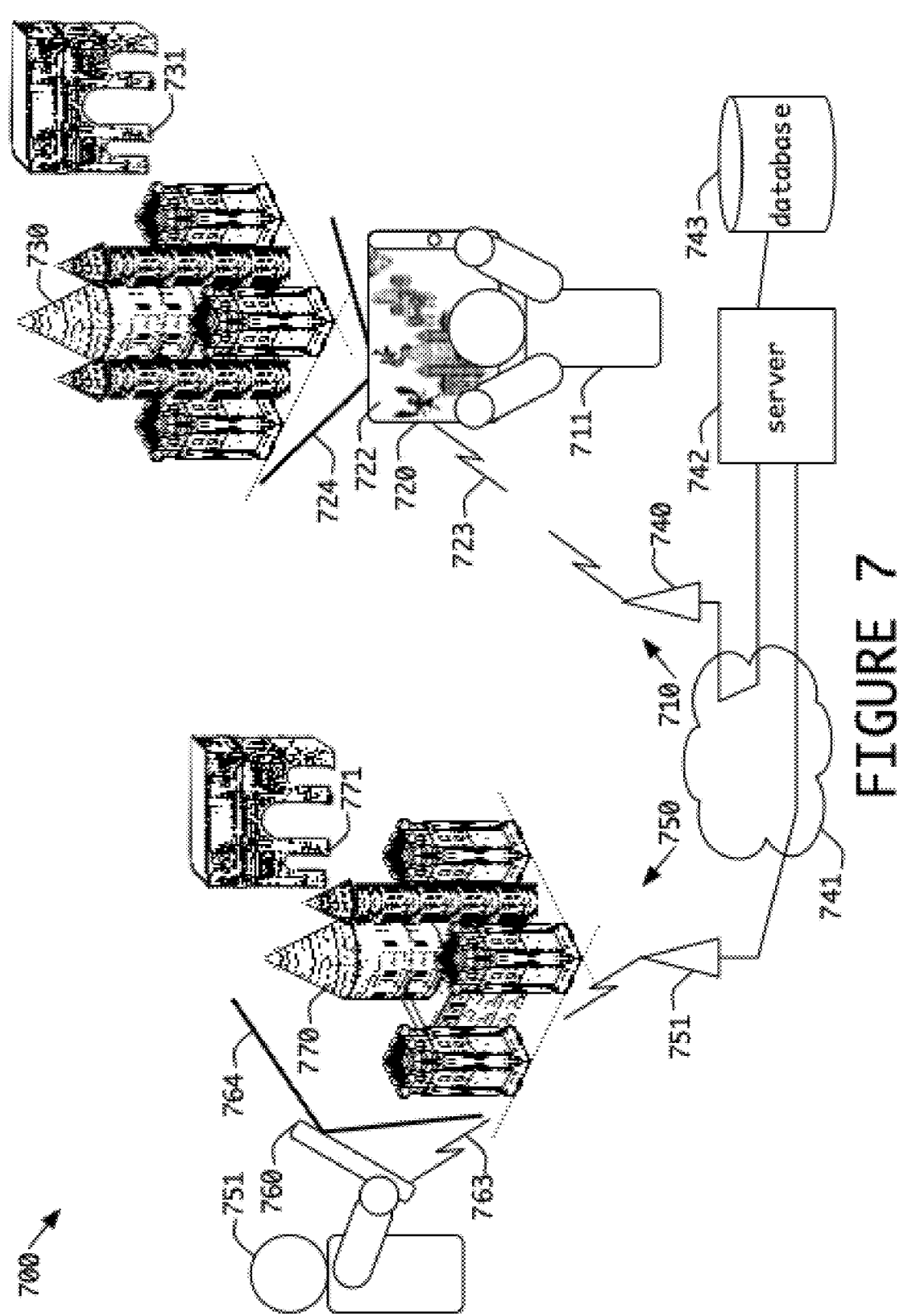
FIG. 7 shows block diagram of another embodiment for a collaborative AR system, where multiple participants use anchors and AR devices at separate sites, yet share a coherent AR experience; and, FIG. 8 illustrates a detailed display from one AR device in the system of FIG. 7.
Figure 8:
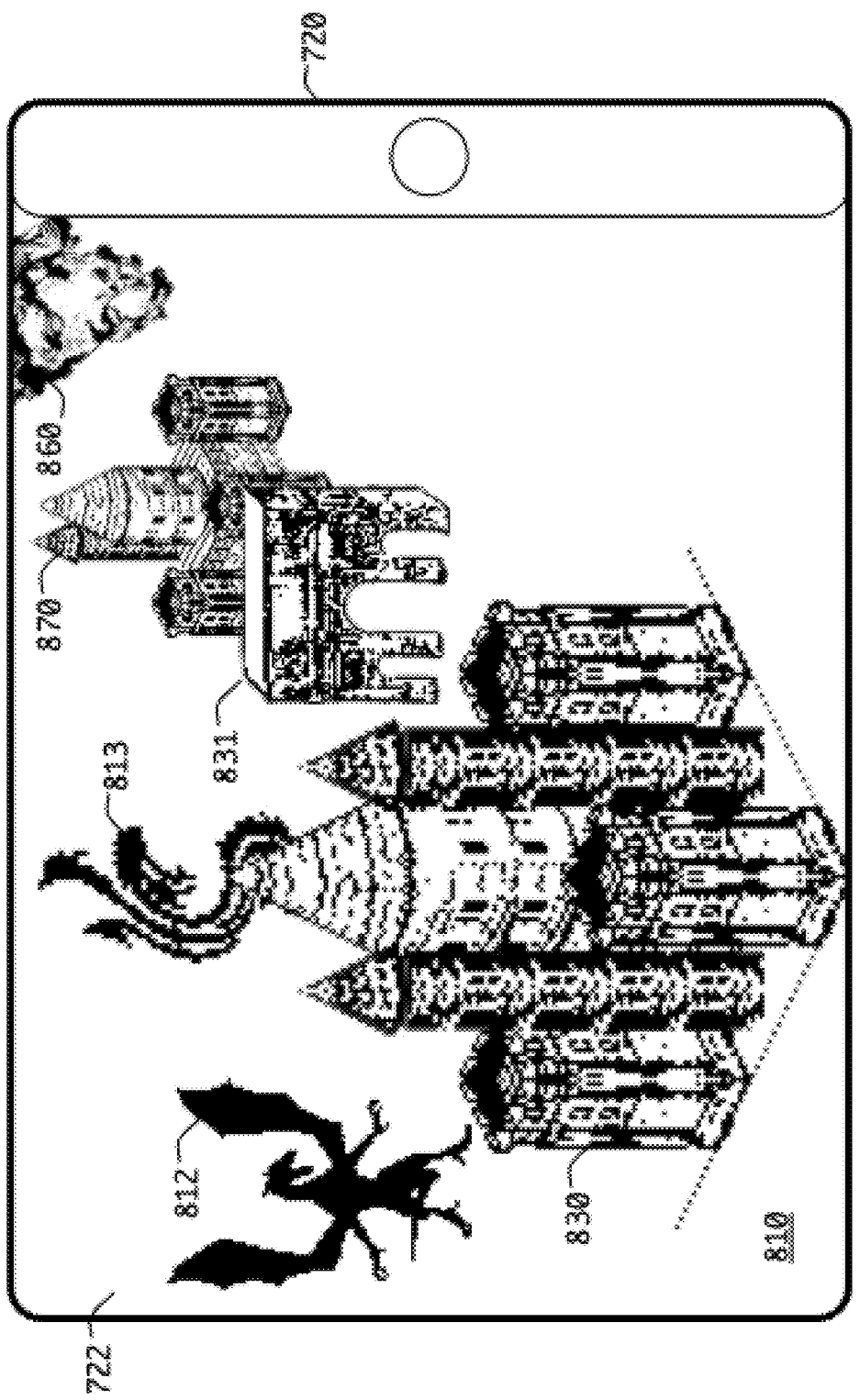

FIG. 7 shows a different configuration of the system, where a common augmented reality is shared at two different sites, 710 and 750. Each site has its own wireless station 740 and 751, respectively, each having communication through the Internet 741 to the shared augmented reality server 742 having database 743 comprising, in one example embodiment, master database portion 500, discussed above.

At site 710, player 711 uses AR device 720 having wireless communication link 723 to station 740. AR device 720, comprising touchscreen 722, has field of view 724, which at least occasionally includes anchor 730 (another castle) and anchor 731 (an arch).

At site 750, player 751 uses AR device 760 having wireless communication link 763 to station 751. AR device 760 has field of view 764 that at least occasionally includes anchor 770 (another castle which need not be distinct from anchor 770, since they are at different sites), and anchor 771 (another arch).

In this configuration, the two arches 731 & 771 are given the role in tables 435 and 530 of portals to their corresponding sites. With that definition, the AR software running on processor 310 can link the two sites 710 and 750 in a shared augmented reality for players 711 and 751. This is achieved by first collecting and then analyzing the records in table 415. On occasions where AR device 760 simultaneously sees and recognizes both of anchors 770 and 771, the physical relationship between the two anchors 770 and 771 is established, as well as the relationship between those anchors and AR device 760. This information is relayed to AR device 720, which can map the arch 771 at site 750 as being in coincidence with the other side of arch 731 at site 710. With this mapping, the augmented reality image 810, shown in detail in FIG. 8, can be generated: A graphic rendition 870 of the castle corresponding to remote anchor 770 can be provided by graphics engine module 312, along with a rendition 860 of player 751 as a game character located in coincidence with the AR position and attitude of remote AR device 760. Meanwhile, the castle image 830 is obtained of local castle 730, and the dragon 812 and fire 813 graphically generated as previously discussed.

The rendition 860 of a character whose gaze is directed by the field of view of another player's AR device (here, 760) provides insight into what the other player is thinking, studying, watching, controlling, even though that player is remotely located and potentially not otherwise viewable.

In another embodiment, the plane of the portal may be defined with respect to an anchor, but not necessarily be coincident with it. That is, for example, the portal that joins the two sites in the augmented reality may be a vertical plane that is set back some distance, say three feet, from a particular anchor, say the castle 730, in a particular direction, say the direction of the main gate. In this embodiment, arch 731 is not needed. Thus, when viewed through an AR device, anchors that exist physically only at the other site (e.g., castle 770) would appear through the AR device to lie beyond a portal three feet in front of the local toy castle's main gate. The AR image 810 in FIG. 8 would be the same, except the image of arch 831 would not be required, since arch 831 was not needed to define the portal.

The particular implementations described, and the discussions regarding details, and the specifics of the figures included herein, are purely exemplary; these implementations and the examples of them, may be modified, rearranged and/or enhanced without departing from the principles of the present invention. In particular, the computer architectures, data structures, and flowcharts herein are exemplary, and significant alteration can be made without departing from the spirit of the invention. As previously mentioned, the choice of a relational database for the representation and explanation of example data management and structures can be readily substituted with other equally effective mechanisms.

Particular features of user interface, image processing module, graphics engine module, and the capabilities of the databases, will depend on the architecture used to implement a system of the present invention, the operating systems of the servers, and AR devices, the CPU selected, and the software code written for them. It is not necessary to describe the details of such programming to permit a person or team of ordinary skill in the art to implement the application, user interface, and services suitable for implementing a system within the scope of the present invention. The details of the software design and programming necessary to implement the principles of the present invention are readily understood from the description herein.

Various additional modifications to the embodiments of the invention, specifically illustrated and described herein, will be apparent to those skilled in the art, particularly in light of the teachings of this invention. Further, it will be apparent that the functionality of this invention can be incorporated into and function from within the context of other products, including an e-commerce system. It is intended that these cover all modifications and embodiments that fall within the spirit and scope of the invention. Thus, while preferred embodiments of the present invention have been disclosed, it will be appreciated that it is not limited thereto but may be otherwise embodied within the scope of the following claims.

The invention claimed is:

1. A computer-implemented method for execution by a server of an augmented reality (AR) system, the method comprising:
   a) receiving, by a server [142], from a first AR device, a first data representative of a first site [100] of the first AR device; [0046; 604]
   b) retrieving, by the server, a first information, in response to the first data, from a database [143] having communication with the server, wherein on a first condition that comprises that the database includes at least a first record that associates a first session with the first site [0037; 501], the first information is representative of a list of sessions that are associated with the first site [0046] the list including the first session, otherwise the first information is representative of no session at the first site;
   c) providing, by the server, the first information to the first AR device; [0046]
   d) accepting, by the server, from the first AR device, on a second condition that the first information is representative of the list, a request to join a second session from the list;
   whereby the server informs the first AR devices whether any sessions are associated with the first site.

2. The method of claim 1 wherein the second session is the first session.

3. The method of claim 1 wherein the first data comprises a location of the first AR device [0045; 602].

4. The method of claim 1 wherein the first data comprises at least one station currently detected by the first AR device [0045; 603].

5. The method of claim 1 wherein an owner of the second session is the initiator of the second session [0046].

6. The method of claim 5 wherein permission to join is from the owner [0046].

7. The method of claim 5 wherein the first condition further comprises that the session is associated with an invitation from the owner [0046].

* * * * *